US010987695B2

(12) United States Patent
Akioka et al.

(10) Patent No.: US 10,987,695 B2
(45) Date of Patent: Apr. 27, 2021

(54) HOT-DIP ZINC-BASED PLATED STEEL SHEET

(71) Applicant: NIPPON STEEL & SUMITOMO METAL CORPORATION, Tokyo (JP)

(72) Inventors: Koji Akioka, Tokyo (JP); Yasuaki Kawamura, Tokyo (JP); Akihiro Sengoku, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/560,986

(22) PCT Filed: Mar. 31, 2016

(86) PCT No.: PCT/JP2016/060798
§ 371 (c)(1),
(2) Date: Sep. 22, 2017

(87) PCT Pub. No.: WO2016/159298
PCT Pub. Date: Oct. 6, 2016

(65) Prior Publication Data
US 2018/0050367 A1 Feb. 22, 2018

(30) Foreign Application Priority Data
Mar. 31, 2015 (JP) .............................. JP2015-073555

(51) Int. Cl.
*C22C 38/54* (2006.01)
*C22C 38/50* (2006.01)
(Continued)

(52) U.S. Cl.
CPC ............. *B05D 1/40* (2013.01); *B05D 3/0272* (2013.01); *B05D 7/14* (2013.01); *B21D 22/022* (2013.01); *B32B 15/013* (2013.01); *B32B 15/04* (2013.01); *B32B 15/043* (2013.01); *B32B 15/18* (2013.01); *C09D 7/61* (2018.01); *C21D 1/18* (2013.01); *C22C 38/001* (2013.01); *C22C 38/002* (2013.01); *C22C 38/02* (2013.01);
(Continued)

(58) Field of Classification Search
CPC ......... C22C 38/28; C22C 38/32; C22C 38/40; C22C 38/44; C22C 38/48; C22C 38/58; C22C 38/54; C22C 38/50; C22C 38/26; C22C 38/22; C22C 38/06; C22C 38/04; C22C 38/02; C22C 38/002; C22C 38/001; C22C 38/08; C22C 38/12; C22C 38/14; C22C 38/18; C23C 28/345; C23C 28/00; C23C 28/021; C23C 28/025; C23C 28/042; C23C 28/30; C23C 28/32; C23C 28/321; C23C 28/3455; C23C 2/40; C23C 2/06; C23C 2/28; C23C 2/26; C23C 30/00; C23C 30/005; C23C 38/3225; C23C 28/3225; B05D 1/40; B05D 7/14; B05D 3/0272; C21D 2211/008; C21D 1/18; B32B 15/013; B32B 15/04; B32B 15/043; B32B 15/18; B21D 22/022; Y10T 428/12569; Y10T 428/12583; Y10T 428/1259; Y10T 428/12611; Y10T 428/12618; Y10T 428/12667; Y10T 428/12799; Y10T 428/12972; Y10T 428/12979; Y10T 428/24967; Y10T 428/27; Y10T 428/273; C09D 7/61
See application file for complete search history.

(56) References Cited
U.S. PATENT DOCUMENTS 5,283,131 A 2/1994 Mori et al.
5,972,522 A 10/1999 Gomi et al.
(Continued)

FOREIGN PATENT DOCUMENTS

CN 1524133 A 8/2004
CN 101960047 A 1/2011
(Continued)

OTHER PUBLICATIONS

ASTM, "Standard Practice for Using Significant Digits in Test Data to Determine Conformance with Specifications", American National Standard, XP055297340, E29-13, Jan. 2013, 5 pages.
Extended European Search Report, dated Aug. 28, 2018, for corresponding European Application No. 16773178.5.
Korean Office Action, dated Oct. 4, 2018, for corresponding Korean Application No. 10-2017-7026348, with partial English translation.
International Search Report for PCT/JP2016/060798 (PCT/ISA/210) dated May 10, 2016.
Taiwanese Office Action issued in TW Application No. 105110549 dated Jan. 12, 2017.
(Continued)

*Primary Examiner* — Michael E. La Villa
(74) *Attorney, Agent, or Firm* — Birch, Stewart, Kolasch & Birch, LLP

(57) ABSTRACT

A hot-dip zinc-based plated steel sheet includes: a base steel sheet that is a metal substrate; a hot-dip zinc-based plating layer provided on the base steel sheet; and a surface treatment layer formed on at least one surface of the hot-dip zinc-based plating layer, in which the surface treatment layer contains more than or equal to 0.1 g/m$^2$ and less than or equal to 1.2 g/m$^2$ of granular oxide per one surface on a metal basis in which, in a temperature range of 900 to 1300 K, standard free energy of formation ($\Delta G^\circ$) of oxide is smaller than standard free energy of formation ($\Delta G^\circ_{Zn}$) of zinc oxide and larger than standard free energy of formation ($\Delta G^\circ_{Al}$) of aluminum oxide at an identical temperature, and the granular oxide has a particle size of more than or equal to 3 nm and less than or equal to 100 nm.

13 Claims, No Drawings

(51) Int. Cl.

| | | |
|---|---|---|
| C22C 38/26 | (2006.01) | |
| C22C 38/22 | (2006.01) | |
| C22C 38/06 | (2006.01) | |
| C22C 38/04 | (2006.01) | |
| C22C 38/02 | (2006.01) | |
| C22C 38/00 | (2006.01) | |
| C23C 2/06 | (2006.01) | |
| C23C 2/28 | (2006.01) | |
| C23C 2/40 | (2006.01) | |
| C21D 1/18 | (2006.01) | |
| B21D 22/02 | (2006.01) | |
| B05D 7/14 | (2006.01) | |
| B05D 3/02 | (2006.01) | |
| B05D 1/40 | (2006.01) | |
| C23C 28/00 | (2006.01) | |
| B32B 15/01 | (2006.01) | |
| C23C 2/26 | (2006.01) | |
| C22C 38/58 | (2006.01) | |
| C09D 7/61 | (2018.01) | |
| C22C 38/28 | (2006.01) | |
| C22C 38/32 | (2006.01) | |
| C22C 38/44 | (2006.01) | |
| C22C 38/12 | (2006.01) | |
| C23C 28/02 | (2006.01) | |
| B32B 15/04 | (2006.01) | |
| C22C 38/18 | (2006.01) | |
| C22C 38/40 | (2006.01) | |
| C22C 38/14 | (2006.01) | |
| C22C 38/08 | (2006.01) | |
| C23C 28/04 | (2006.01) | |
| C22C 38/48 | (2006.01) | |
| C23C 30/00 | (2006.01) | |
| B32B 15/18 | (2006.01) | |

(52) U.S. Cl.
CPC .............. *C22C 38/04* (2013.01); *C22C 38/06* (2013.01); *C22C 38/08* (2013.01); *C22C 38/12* (2013.01); *C22C 38/14* (2013.01); *C22C 38/18* (2013.01); *C22C 38/22* (2013.01); *C22C 38/26* (2013.01); *C22C 38/28* (2013.01); *C22C 38/32* (2013.01); *C22C 38/40* (2013.01); *C22C 38/44* (2013.01); *C22C 38/48* (2013.01); *C22C 38/50* (2013.01); *C22C 38/54* (2013.01); *C22C 38/58* (2013.01); *C23C 2/06* (2013.01); *C23C 2/26* (2013.01); *C23C 2/28* (2013.01); *C23C 2/40* (2013.01); *C23C 28/00* (2013.01); *C23C 28/021* (2013.01); *C23C 28/025* (2013.01); *C23C 28/042* (2013.01); *C23C 28/30* (2013.01); *C23C 28/32* (2013.01); *C23C 28/321* (2013.01); *C23C 28/3225* (2013.01); *C23C 28/345* (2013.01); *C23C 28/3455* (2013.01); *C23C 30/00* (2013.01); *C23C 30/005* (2013.01); *C21D 2211/008* (2013.01); *Y10T 428/1259* (2015.01); *Y10T 428/12569* (2015.01); *Y10T 428/12583* (2015.01); *Y10T 428/12611* (2015.01); *Y10T 428/12618* (2015.01); *Y10T 428/12667* (2015.01); *Y10T 428/12799* (2015.01); *Y10T 428/12972* (2015.01); *Y10T 428/12979* (2015.01); *Y10T 428/24967* (2015.01); *Y10T 428/27* (2015.01); *Y10T 428/273* (2015.01)

(56) References Cited

U.S. PATENT DOCUMENTS

| | | | |
|---|---|---|---|
| 10,549,506 B2* | 2/2020 | Kawamura | ............ C23C 22/34 |
| 2004/0244648 A1 | 12/2004 | Akui et al. | |
| 2006/0182988 A1* | 8/2006 | Yamaji | ............... C09D 5/10 |
| | | | 428/629 |
| 2008/0107910 A1 | 5/2008 | Chida et al. | |
| 2012/0288734 A1 | 11/2012 | Matsumura et al. | |
| 2016/0305003 A1* | 10/2016 | Shimizu | ................... C23C 2/06 |
| 2018/0044809 A1* | 2/2018 | Kawamura | ............... C23C 2/26 |
| 2018/0079174 A1* | 3/2018 | Kawamura | ............... C23C 2/26 |

FOREIGN PATENT DOCUMENTS

| | | | | |
|---|---|---|---|---|
| CN | 102301035 A | 12/2011 | | |
| CN | 102648304 A | 8/2012 | | |
| CN | 102753730 A | 10/2012 | | |
| EP | 1482074 A1 * | 12/2004 | ............ | C23C 22/08 |
| JP | 11-302870 A | 11/1999 | | |
| JP | 11-302871 A | 11/1999 | | |
| JP | 2003-73774 A | 3/2003 | | |
| JP | 2003-126921 A | 5/2003 | | |
| JP | 2003-129209 A | 5/2003 | | |
| JP | 2004-270029 A | 9/2004 | | |
| JP | 2004-323897 A | 11/2004 | | |
| JP | 2007-39780 A | 2/2007 | | |
| JP | 2007-63578 A | 3/2007 | | |
| JP | 2007-291508 A | 11/2007 | | |
| JP | 2011-508089 A | 3/2011 | | |
| JP | 2011-74409 A | 4/2011 | | |
| JP | 2013-1981 A | 1/2013 | | |
| TW | 201131018 A1 | 9/2011 | | |
| TW | 201217158 A1 | 5/2012 | | |
| WO | 2012/004889 A1 | 1/2012 | | |
| WO | WO-2015083325 A1 * | 6/2015 | ............ | C22C 18/00 |

OTHER PUBLICATIONS

Written Opinion of the International Searching Authority for PCT/JP2016/060798 (PCT/ISA/237) dated May 10, 2016.

Author Unknown, "How is performance of a steel to be improved by niobium?", 2007, pp. 50-53 (13 pages total), with partial English translation.

Chinese Office Action and Search Report dated Nov. 19, 2018, for corresponding Chinese Application No. 201680017777.6, with a partial English translation of the Chinese Office Action.

Japanese Office Action, dated Mar. 19, 2019, for corresponding Japanese Application No. 2017-510222, with a partial English translation.

Indian Office Action dated May 28, 2019 for corresponding Application No. 201717036434, along with an English translation.

Korean Office Action dated Apr. 22, 2019 for corresponding Application No. 10-2017-7026348, along with an English translation.

Japanese Office Action dated Nov. 6, 2018, for corresponding Japanese Application No. 2017-510222, with partial English translation.

Chinese Office Action for corresponding Chinese Application No. 201680017777.6, dated Sep. 26, 2019, with a partial English translation.

Chinese Office Action dated Jun. 12, 2019, for corresponding Chinese Application No. 201680017777.6, with a partial English translation.

Brazilian Office Action and Search Report for corresponding Brazilian Application No. BR112017020270-0, dated Feb. 18, 2020, with a partial English translation.

Souza et al., "A comparison of TEM and DLS methods to characterize size distribution of ceramic nanoparticles," Journal of Physics: Conference Series, vol. 733, 2016, 6 pages total.

* cited by examiner

HOT-DIP ZINC-BASED PLATED STEEL SHEET

TECHNICAL FIELD

The present invention relates to a hot-dip zinc-based plated steel sheet.

BACKGROUND ART

These days, to protect the environment and prevent global warming, the suppression of the consumption of fossil fuel is increasingly demanded, and the demand influences various manufacturing industries. For example, automobiles, which are indispensable to daily life and activity as a moving means, are no exception, and improvements in fuel efficiency etc. by the weight reduction of car bodies etc. are required. However, for automobiles, simply achieving a weight reduction of the car body is not permitted in terms of the functionality of the product, and it is necessary to ensure proper safety.

Most of the structure of the automobile is formed of iron-based materials, in particular steel sheets, and the reduction in the weight of the steel sheet is important to the weight reduction of the car body. However, as described above, simply reducing the weight of the steel sheet is not permitted, and ensuring the mechanical strength of the steel sheet is required at the same time. Such a demand on the steel sheet is placed not only in the automobile manufacturing industry but also in various manufacturing industries similarly. Hence, research and development are being made to enhance the mechanical strength of the steel sheet and thereby obtain a steel sheet in which the mechanical strength can be maintained or improved even when the wall thickness is made smaller than those of conventionally used steel sheets.

In general, a material having high mechanical strength tends to decrease in shape fixability in molding such as bending, and is difficult to mold into a complicated shape. As a means for solving such a problem with moldability, what is called "the hot pressing method (also called the hot stamping method or the die quenching method)" is given. In the hot pressing method, a material to be molded is once heated to high temperature, the steel sheet softened by heating is pressed to be molded, and then cooling is performed. By the hot pressing method, the material of the object can be easily pressed because the material is once heated to high temperature and softened. Furthermore, the mechanical strength of the material can be enhanced by the quenching effect by the cooling after molding. Thus, a molded product in which both good shape fixability and high mechanical strength are achieved can be obtained by the hot pressing method.

However, when the hot pressing method is used for a steel sheet, the surface of the steel sheet is oxidized by the steel sheet being heated to a high temperature of 800° C. or more, and scales (compounds) are produced. Hence, the process of removing the scales (what is called a descaling process) is needed after hot pressing is performed, and productivity is reduced. In addition, in a member etc. requiring corrosion resistance, it is necessary to perform anti-rust treatment or metal covering on the surface of the member after processing, and a surface cleaning process and a surface treatment process are needed; consequently, productivity is further reduced.

As a method to suppress such a reduction in productivity, for example, a method in which a steel sheet to be hot pressed is provided with a covering in advance is given. Various materials such as organic-based materials and inorganic-based materials are generally used as the covering on the steel sheet. Among these, plated steel sheets based on zinc (Zn), which has a sacrificial anti-corrosion action on the steel sheet, are widely used as automotive steel sheets etc. from the viewpoints of the anti-corrosion capacity and the steel sheet production technique.

By providing a zinc-based metal covering, the production of scales on the surface of the steel sheet can be prevented, and processes such as descaling become unnecessary; thus, the productivity of molded products is improved. In addition, the zinc-based metal covering has also an anti-rust effect, and therefore also corrosion resistance is improved. Patent Literature 1 to Patent Literature 4 below disclose a method of hot pressing a plated steel sheet that is obtained by providing a zinc-based metal covering to a steel sheet having a prescribed component composition.

In Patent Literature 1 to Patent Literature 3 below, a hot-dip galvanized steel sheet or an alloyed hot-dip galvannealed steel sheet is used as a steel sheet for hot pressing. By using a hot-dip galvanized steel sheet or an alloyed hot-dip galvannealed steel sheet for hot pressing, a structure member can be molded without iron oxides (that is, scales) being formed on the surface. Further, in view of the fact that, when a zinc oxide layer is formed thick on the surface of a heat-treated steel material obtained by hot pressing a zinc-based plated steel sheet, the coating film adhesiveness and the post-coating corrosion resistance of the heat-treated steel material are adversely affected, Patent Literature 4 below discloses an invention in which a heat-treated steel material is subjected to shot blasting to remove a zinc oxide layer or is subjected to coating after the thickness of a zinc oxide layer is reduced.

Patent Literature 5 and Patent Literature 6 below disclose inventions that improve the coating film adhesiveness and the post-coating corrosion resistance of a heat-treated steel material obtained by hot pressing a zinc-based plated steel sheet. Patent Literature 5 below discloses an invention in which a hot-dip galvanized steel sheet with its surface covered with a silicone resin coating film is used as a steel sheet for hot pressing, and Patent Literature 6 below discloses an invention in which a hot-dip galvanized steel sheet covered with a barrier layer containing phosphorus (P) and silicon (Si) (a phosphate is given as an example of P, and colloidal silica is given as an example of Si) is used as a steel sheet for hot pressing.

Patent Literature 7 below discloses a technology in which elements that are easier to oxidize than Zn (easily oxidizable elements) are added into a galvanized layer and an oxide layer of these easily oxidizable elements is formed on the outer layer of the galvanized layer during the temperature increase in hot pressing, and thereby the volatilization of zinc is prevented.

According to the inventions disclosed by Patent Literature 5 to Patent Literature 7 below, since a galvanized layer is covered with the barrier layer described above, the vaporization of zinc is suppressed, and thus the adhesiveness of an intermediate coating film and an over-coating film and post-coating corrosion resistance are good.

CITATION LIST

Patent Literature

Patent Literature 1: JP 2003-73774A
Patent Literature 2: JP 2003-129209A

Patent Literature 3: JP 2003-126921A
Patent Literature 4: JP 2004-323897A
Patent Literature 5: JP 2007-63578A
Patent Literature 6: JP 2007-291508A
Patent Literature 7: JP 2004-270029A

SUMMARY OF INVENTION

Technical Problem

However, in the zinc-based plated steel sheet, particularly in the case where a hot-dip galvanized steel sheet or an alloyed hot-dip galvanized steel sheet is hot pressed, oxidation of zinc during heating of hot pressing cannot be avoided, and the amount of metal zinc remaining in the plating layer after the hot pressing decreases. With decrease of the mount of metal zinc, there is a case in which not only post-coating corrosion resistance but also corrosion resistance at an uncoated portion may deteriorate.

In addition, when the present inventors conducted a check experiment on a heat-treated steel material disclosed by Patent Literature 5 above that was obtained by using, as a steel sheet for hot pressing, a hot-dip galvanized steel sheet with its surface covered with a silicone resin coating film, it has been found that, although post-coating corrosion resistance in a cycle corrosion test in which a dry and a wet environment are repeated is good, zinc is excessively oxidized during heating of hot pressing, and the corrosion resistance at an uncoated portion is not necessarily good. Hence, a heat-treated steel material obtained by the invention disclosed in Patent Literature 5 above is not suitable for use as it is for a part or a member at a joint of steel materials (for example, a portion at which sheets are put together for reinforcement, near a spot-welded portion inside a locker, etc.), for example.

On the other hand, with the addition of easily oxidizable elements into a galvanized layer disclosed in Patent Literature 7 above, although the oxidation of zinc is suppressed, new operational actions are necessary, such as the temperature control of the plating bath and dross measures.

Thus, the present invention has been made in view of the issue mentioned above, and an object of the present invention is to provide a hot-dip zinc-based plated steel sheet which suppresses excessive production of zinc oxides on the outer layer after hot pressing more conveniently and is excellent in corrosion resistance at an uncoated portion.

Solution to Problem

On the basis of the findings obtained by extensive studies on the plated steel sheet for hot pressing of the object mentioned above, the present inventors have thought up the following hot-dip zinc-based plated steel sheet.

The gist of the present invention is as follows.

(1)

A hot-dip zinc-based plated steel sheet including:
a base steel sheet that is a metal substrate;
a hot-dip zinc-based plating layer provided on the base steel sheet; and
a surface treatment layer formed on at least one surface of the hot-dip zinc-based plating layer, in which
the surface treatment layer contains more than or equal to 0.1 g/m² and less than or equal to 1.2 g/m² of granular oxide per one surface on a metal basis in which, in a temperature range of 900 to 1300 K, standard free energy of formation ($\Delta G^0$) of oxide is smaller than standard free energy of formation ($\Delta G^0_{Zn}$) of zinc oxide and larger than standard free energy of formation ($\Delta G^0_{Al}$) of aluminum oxide at an identical temperature, and
the granular oxide has a particle size of more than or equal to 3 nm and less than or equal to 100 nm.

(2)

The hot-dip zinc-based plated steel sheet according to (1), in which
the surface treatment layer further contains at least one of one or more phosphorus-containing compounds, one or more vanadium-containing compounds, one or more copper-containing compounds, one or more aluminum-containing compounds, or one or more chromium-containing compounds in the following range as a content per one surface,
the one or more phosphorus-containing compounds: more than or equal to 0.0 g/m² and less than or equal to 0.01 g/m² on a P basis,
the one or more vanadium-containing compounds: more than or equal to 0.0 g/m² and less than or equal to 0.01 g/m² on a V basis,
the one or more copper-containing compounds: more than or equal to 0.0 g/m² and less than or equal to 0.02 g/m² on a Cu basis,
the one or more aluminum-containing compounds: more than or equal to 0.0 g/m² and less than or equal to 0.005 g/m² on an Al basis, and
the one or more chromium-containing compounds: more than or equal to 0.0 g/m² and less than or equal to 0.01 g/m² on a Cr basis.

(3)

The hot-dip zinc-based plated steel sheet according to (1) or (2), in which the base steel sheet has a chemical composition of, in mass %,
C: 0.05 to 0.4%,
Si: less than or equal to 0.5%,
Mn: 0.5 to 2.5%,
P: less than or equal to 0.03%,
S: less than or equal to 0.01%,
sol. Al: less than or equal to 0.1%,
N: less than or equal to 0.01%,
B: 0 to 0.005%,
Ti: 0 to 0.1%,
Cr: 0 to 0.5%,
Nb: 0 to 0.1%,
Ni: 0 to 1.0%,
Mo: 0 to 0.5%, and
the balance: Fe and impurities.

(4)

The hot-dip zinc-based plated steel sheet according to (1) or (2), in which
the base steel sheet has a chemical composition of, in mass %,
C: 0.05 to 0.4%,
Si: less than or equal to 0.5%,
Mn: 0.5 to 2.5%,
P: less than or equal to 0.03%,
S: less than or equal to 0.01%,
sol. Al: less than or equal to 0.1%,
N: less than or equal to 0.01%,
B: 0 to 0.005%,
Ti: 0 to 0.1%,
Cr: more than 0% and less than or equal to 0.5%,
Nb: 0 to 0.1%,
Ni: 0 to 1.0%,
Mo: 0 to 0.5%, and
the balance: Fe and impurities, and
the base steel sheet satisfies a relationship of
Mn+Cr: 0.5 to 3.0%.

(5)

The hot-dip zinc-based plated steel sheet according to any one of (1) to (4), in which the granular oxide is metal oxide.

(6)

The hot-dip zinc-based plated steel sheet according to any one of (1) to (5), in which the granular oxide is an oxide of titanium or an oxide of silicon.

(7)

The hot-dip zinc-based plated steel sheet according to any one of (1) to (6), in which the granular oxide has a particle size of more than or equal to 5 nm and less than or equal to 30 nm.

(8)

The hot-dip zinc-based plated steel sheet according to any one of (1) to (7), in which a content of the granular oxide per one surface on a metal basis is more than or equal to 0.2 g/m$^2$ and less than or equal to 0.8 g/m$^2$.

(9)

The hot-dip zinc-based plated steel sheet according to any one of (1) to (8), in which the surface treatment layer contains more than or equal to 0.05 g/m$^2$ and less than or equal to 0.35 g/m$^2$ of an oxide of an alkaline-earth metal per one surface on a metal basis in which, in a temperature range of 900 to 1300 K, standard free energy of formation ($\Delta G^0$) of oxide is smaller than standard free energy of formation ($\Delta G^0_{Al}$) of aluminum oxide at an identical temperature.

(10)

The hot-dip zinc-based plated steel sheet according to (9), in which the oxide of the alkaline-earth metal is an oxide of calcium or an oxide of magnesium.

(11)

The hot-dip zinc-based plated steel sheet according to (9) or (10), in which the content of the oxide of the alkaline-earth metal per one surface on a metal basis is more than or equal to 0.05 g/m$^2$ and less than or equal to 0.2 g/m$^2$.

(12)

The hot-dip zinc-based plated steel sheet according to any one of (1) to (11), in which the hot-dip zinc-based plated steel sheet is a hot-dip zinc-based plated steel sheet for hot pressing.

Advantageous Effects of Invention

As described above, according to the present invention, it becomes possible to improve the corrosion resistance at the uncoated portion by suppressing production of zinc oxides on the outer layer during hot pressing and ensuring the amount of metal zinc remaining in the plating layer after the hot pressing.

DESCRIPTION OF EMBODIMENTS

Hereinafter, preferred embodiments of the present invention are described in detail.

<1. Hot-Dip Zinc-Based Plated Steel Sheet>

A hot-dip zinc-based plated steel sheet according to an embodiment of the present invention includes a hot-dip zinc-based plating layer on a base steel sheet, and also includes a surface treatment layer to be described in detail below on at least one surface of the hot-dip zinc-based plating layer. The surface treatment layer contains more than or equal to 0.1 g/m$^2$ and less than or equal to 1.2 g/m$^2$ of granular oxide per one surface on a metal basis in which, in a temperature range of 900 to 1300 K, standard free energy of formation ($\Delta G^0$) of oxide is smaller than standard free energy of formation ($\Delta G^0_{Zn}$) of zinc oxide and larger than standard free energy of formation ($\Delta G^0_{Al}$) of aluminum oxide at an identical temperature, and the granular oxide has a particle size of more than or equal to 3 nm and less than or equal to 100 nm. The hot-dip zinc-based plated steel sheet having such a configuration can be suitably used for the hot pressing method described above. Hereinafter, configuration of such a hot-dip zinc-based plated steel sheet will be described in detail.

(1) Base Steel Sheet

The base steel sheet used for the hot-dip zinc-based plated steel sheet according to the present embodiment is not particularly limited, and various steel sheets having known characteristics and chemical compositions may be used. The chemical composition of the steel sheet is not particularly limited, but is preferably a chemical composition with which high strength is obtained by quenching. For example, when it is attempted to obtain a heat-treated steel material with a tensile strength of 980 MPa or more, an example of the base steel sheet is made of steel for quenching having a chemical composition of, in mass %, C: 0.05 to 0.4%, Si: less than or equal to 0.5%, Mn: 0.5 to 2.5%, P: less than or equal to 0.03%, S: less than or equal to 0.01%, sol. Al: less than or equal to 0.1%, N: less than or equal to 0.01%, B: 0 to 0.005%, Ti: 0 to 0.1%, Cr: 0 to 0.5%, Nb: 0 to 0.1%, Ni: 0 to 1.0%, Mo: 0 to 0.5%, and the balance: Fe and impurities.

When it is attempted to obtain a heat-treated steel material with a relatively low strength in which the strength becomes less than 980 MPa during quenching, the chemical composition of the base steel sheet is not necessarily be in the range described above.

The total amount of Mn and Cr contained is preferably 0.5 to 3.0% from the viewpoint of quenchability during the quenching described above and the viewpoint of forming Mn oxides and Cr oxides contained in a zinc oxide layer after heating. The total amount of Mn and Cr contained is more preferably 0.7 to 2.5%.

When Mn and Cr are contained as the chemical composition of the steel sheet, part of the zinc oxide layer formed on the outer layer after hot pressing becomes composite oxides containing Mn and Cr. Adhesiveness between a coating film component and a plating component is improved and mold-adhesion resistance becomes excellent by forming these composite oxides containing Mn and Cr. Although details are unknown, it is presumed that, by these composite oxides being formed, the formed coating film is dense as compared to zinc oxide, and satisfactory mold-adhesion resistance is exhibited.

In the case where Mn and Cr are contained as the chemical composition of the steel sheet, the content of Mn+Cr is preferably in the range of, in mass %, more than or equal to 0.5% and less than or equal to 3.0%, and more preferably in the range of more than or equal to 0.7% and less than or equal to 2.5%. In the case where the content of Mn+Cr is less than 0.5%, zinc oxide that is formed on the outer layer after hot pressing and composite oxides that contain Mn and Cr are insufficient, and it may be difficult to bring out more satisfactory mold-adhesion resistance. On the other hand, in the case where the content of Mn+Cr exceeds 3.0%, although there is no problem with coating adhesiveness, the cost is increased, and furthermore the toughness of the spot welded portion may be significantly reduced and the wettability of plating may be significantly degraded.

(2) Hot-Dip Zinc-Based Plating Layer

The hot-dip zinc-based plating layer according to the present embodiment is not particularly limited, and commonly known hot-dip zinc-based plating may be used. Specifically, examples of the hot-dip zinc-based plating layer according to the present embodiment include hot-dip galvanizing, alloyed hot-dip galvanizing, hot-dip Zn-55% Al plating, hot-dip Zn-11% Al plating, hot-dip Zn-11% Al-3% Mg plating, hot-dip Zn-7% Al-3% Mg plating, and hot-dip Zn-11% Al-3% Mg-0.2% Si plating.

Note that the hot-dip zinc-based plating dealt with by the present invention contains Al in a plating bath and a plating layer even in cases other than Zn—Al-based alloy plating containing aluminum (Al) as a main component. The reason is as follows. That is, the temperature of the plating bath is approximately 440 to 480° C.; in this temperature range, when Zn and Fe come into contact, Fe and Zn are continuously alloyed, and consequently dross occurs. By putting Al in the plating bath, the reaction between Fe and Al occurs before the reaction between Fe and Zn occurs, and consequently the occurrence of dross is suppressed. For this reason, usually Al is contained in a hot-dip galvanizing bath.

In general, in hot-dip galvanizing, Al is contained at 0.2 to 0.3% in the plating bath, and 0.2 to 1.0 mass % of Al is contained in the plating layer; in alloyed hot-dip galvanizing, Al is contained at 0.1 to 0.2% in the plating bath, and 0.1 to 0.5 mass % of Al is contained in the plating layer.

The Al in the plating layer diffuses and moves to the outer layer of the plating layer not only during the formation of a plating coating film but also during the heating of hot pressing. At this time, Al is oxidized preferentially as compared to Zn, and forms an Al oxide film made of $Al_2O_3$.

In the present embodiment, as a specific plating operation, an operation in which a steel sheet is dipped in a plating bath in which Zn or a Zn alloy in a molten state is retained and the steel sheet is pulled up from the plating bath is performed. The amount of plating attached to the steel sheet is controlled by adjusting the speed of the pulling-up of the steel sheet, the flow rate and the flow velocity of wiping gas jetted from a wiping nozzle provided above the plating bath, etc. Alloying treatment is performed by, after plating treatment like the above, additionally heating the plated steel sheet using a gas furnace or an induction heating furnace, a heating furnace in which these are combined, or the like. The plating operation may also be performed by the method of continuously plating a coil or the method of plating a cut sheet single body.

The thickness of the hot-dip zinc-based plating layer (that is, the amount of the hot-dip zinc-based plating layer attached) is preferably in the range of 20 $g/m^2$ to 100 $g/m^2$ per one surface. In the case where the thickness of the hot-dip zinc-based plating layer is less than 20 $g/m^2$ per one surface, the effective amount of Zn after hot pressing cannot be ensured and corrosion resistance is insufficient; thus, this is not preferable. In the case where the thickness of the hot-dip zinc-based plating layer is more than 100 $g/m^2$ per one surface, the processability and the adhesiveness of the plating layer are reduced; thus, this is not preferable. A more preferred thickness of the hot-dip zinc-based plating layer is in the range of 30 $g/m^2$ to 90 $g/m^2$ per one surface.

(3) Surface Treatment Layer

On the hot-dip zinc-based plating layer described above, a surface treatment layer is further formed, the surface treatment layer containing granular oxide in which, in a temperature range of 900 to 1300 K, standard free energy of formation ($\Delta G^0$) of oxide is smaller than standard free energy of formation ($\Delta G^0_{Zn}$) of zinc oxide and larger than standard free energy of formation ($\Delta G^0_{Al}$) of aluminum oxide at an identical temperature. Such oxide is reduced by Al contained in the zinc-based plating layer, and is oxidized preferentially as compared to Zn, thus, it is presumed that production of zinc oxide is suppressed.

Here, the "granular oxide" represents a substance that contains oxide as a main component, which exists in a state of being dispersed in a treatment liquid as a solid having a size of several nanometers or more as a primary particle size, and does not exist in a state of being dissolved in the treatment liquid like a compound of nitrate, sulfate, lithium salt, or the like. Using the granular oxide which is dispersed in the treatment liquid in the solid state and in which, in the temperature range of 900 to 1300 K, the standard free energy of formation ($\Delta G^0$) of oxide is smaller than the standard free energy of formation ($\Delta G^0_{Zn}$) of zinc oxide and larger than the standard free energy of formation ($\Delta G^0_{Al}$) of aluminum oxide at an identical temperature, there can be provided a heat-treated steel material having excellent durability particularly in an environment of a portion at which sheets are put together where coating is not delivered. Note that such granular oxide exists in a state of particles in the surface treatment layer.

Here, specific values of the standard free energy of formation of zinc oxide (ZnO) and the standard free energy of formation of aluminum oxide ($Al_2O_3$) in the temperature range of 900 to 1300 K can be found by referring to known data such as "Anticorrosion handbook edited by Japan Society of Corrosion Engineering". For example, the standard free energy of formation ($\Delta G^0_{Zn}$) of zinc oxide (ZnO) at 900 K and the standard free energy of formation ($\Delta G^0_{Zn}$) of zinc oxide (ZnO) at 1300 K are approximately −535 kJ/mol and −460 kJ/mol, respectively, and the standard free energy of formation ($\Delta G^0_{Al}$) of aluminum oxide ($Al_2O_3$) at 900 K and the standard free energy of formation ($\Delta G^0_{Al}$) of aluminum oxide ($Al_2O_3$) at 1300 K are approximately −945 kJ/mol and −880 kJ/mol, respectively.

Examples of the granular oxide in which, in the temperature range of 900 to 1300 K, the standard free energy of formation ($\Delta G^0$) of oxide is smaller than the standard free energy of formation ($\Delta G^0_{Zn}$) of ZnO and larger than the standard free energy of formation ($\Delta G^0_{Al}$) of $Al_2O_3$ at an identical temperature include oxides of silicon (Si), oxides of titanium (Ti), oxides of chromium (Cr), oxides of vanadium (V), oxides of manganese (Mn), and oxides of boron (B).

Of those, oxides of metal elements (that is, metal oxides) are stable, and are appropriate for reasons of availability. Examples of such metal oxides include Si oxides, Ti oxides, Cr oxides, and V oxides. Note that an oxide of an element which belongs to a semiconductor or a metal depending on the crystal structure, such as Si, is also included in the metal oxides.

In view of the current tendency of attention to environmental protection being strongly required, it is preferred that the Cr oxides do not contain chromium content including trivalent chromium, let alone hexavalent chromium, that is, the Cr oxides are preferably chromium-free. Therefore, Si oxides and Ti oxides are preferably used as the granular oxide satisfying the condition of the standard free energy of formation described above.

Further, the particle size (primary particle size) of the granular oxide satisfying the condition of the standard free energy of formation described above is more than or equal to 3 nm and less than or equal to 100 nm. For the particle size of the oxide, a smaller size is advantageous in terms of post-coating corrosion resistance, but those with a particle size of less than 3 nm are difficult to obtain and are disadvantageous in terms of cost. Further, in the case where the particle size of the granular oxide exceeds 500 nm, the surface area is reduced, and accordingly it is feared that the reactivity with the underlying plating during heating will be reduced; thus, this is not preferable. The particle size of magnesium oxide is preferably more than or equal to 5 nm and less than or equal to 30 nm.

The particle size (primary particle size) of the granular oxide described above can be measured by a known method; for example, the measurement can be performed by a method in which a cross section-embedded sample is prepared after coating, several particle sizes of oxide particles in the coating film are measured, and the average of the obtained measurement results is taken as the particle size.

The surface treatment layer according to the present embodiment is formed from a treatment liquid containing the granular oxide satisfying the condition of the standard free energy of formation described above. The surface treatment layer according to the present embodiment contains more than or equal to 0.1 g/m$^2$ and less than or equal to 1.2 g/m$^2$ of granular oxide per one surface on a metal basis, the granular oxide satisfying the condition of the standard free energy of formation described above.

In the hot-dip zinc-based plated steel sheet including such a surface treatment layer containing more than or equal to 0.1 g/m$^2$ and less than or equal to 1.2 g/m$^2$ of granular oxide per one surface on a metal basis, an Al oxide that is present in the hot-dip galvanized layer before hot pressing and is formed during hot pressing reduces the oxide contained in the surface treatment layer. Since the metal particles obtained by reducing the oxide more easily form an oxide as compared to Zn, the metal particle is oxidized preferentially as compared to Zn. Consequently, it is assumed that the production of zinc oxide is suppressed.

In the case where the amount of the granular oxide attached to the surface treatment layer per one surface on a metal basis is less than 0.1 g/m$^2$, the metal particles obtained by reducing the oxide which are necessary for suppressing production of zinc oxide during hot pressing are not sufficiently present, and hence, the production of zinc oxide cannot be suppressed and sufficient corrosion resistance cannot be ensured. On the other hand, in the case where the amount of the granular oxide attached to the surface treatment layer per one surface on a metal basis exceeds 1.2 g/m$^2$, the cost of the hot-dip zinc-based plated steel sheet according to the present embodiment is increased, and it is presumed that the cohesive force of the surface treatment layer is weakened and a coating film that is formed on the surface treatment layer after hot pressing is likely to peel off.

The amount of granular oxide attached to the surface treatment layer per one surface on a metal basis is preferably more than or equal to 0.2 g/m$^2$ and less than or equal to 0.8 g/m$^2$.

Here, the amount of the granular oxide attached to the surface treatment layer on a metal basis can be measured by a known method; for example, the measurement can be performed by dissolving the surface treatment layer and using inductively coupled plasma (ICP) emission spectrometric analysis.

As the treatment liquid containing the granular oxide satisfying the condition of the standard free energy of formation described above, there can be used a treatment liquid in which powder of oxide of silicon, titanium, manganese, or the like is dispersed. Further, as an already dispersed treatment liquid, it is more preferred that titania sol and silica sol be used. Specific example of commercially available products of titania sol includes TKS (registered trademark) series manufactured by Tayca Corporation. Specific example of commercially available products of silica sol includes Snowtex (registered trademark) series manufactured by Nissan Chemical Industries, Ltd.

In forming the surface treatment layer, the above-mentioned titania sol and silica sol may be applied as they are to the hot-dip galvanized steel sheet, however, in order to improve stability of the treatment liquid and adhesiveness of the surface treatment layer, it is more preferred that the treatment liquid have a resin or a crosslinking agent mixed therein, and the treatment liquid be applied to the hot-dip zinc-based plated steel sheet.

In the case where the above titania sol and silica sol are used, a water-soluble or water-dispersible resin is preferably used as the resin, and examples of the resin include a polyurethane resin, a polyester resin, an epoxy resin, a (meth)acrylic resin, a polyolefin resin, a phenol resin, and modified products of those resins. In the case where titania powder and silica powder are used, a solvent resin in which any of various solvents is used as the solvent may be used in addition to the above-mentioned water-based resin.

Examples of the crosslinking agent include a silane coupling agent, a zirconium carbonate compound, an organic titanium compound, an oxazoline polymer, a water-soluble epoxy compound, a water-soluble melamine resin, a water-dispersible blocked isocyanate, and a water-based aziridine compound.

Note that also in the case where the above-mentioned resin or crosslinking agent is mixed, the content of the granular oxide satisfying the condition of the standard free energy of formation described above is, as described above, more than or equal to 0.1 g/m$^2$ and less than or equal to 1.2 g/m$^2$ per one surface on a metal basis in the surface treatment layer.

Further, as another component that is preferably contained in the surface treatment layer according to the present embodiment, for example, there is given an oxide of alkaline-earth metal in a broad sense (that is, beryllium, magnesium, calcium, strontium, barium, and radium, which are elements in the second group of the periodic table) in which, in the temperature range of 900 to 1300 K, the standard free energy of formation ($\Delta G^0$) of oxide is smaller than the standard free energy of formation ($\Delta G^0_{Al}$) of aluminum oxide at an identical temperature.

When the oxide of alkaline-earth metal is contained in the surface treatment layer, it is surmised that the oxide of alkaline-earth metal exists stably in a state of ordinary metal oxide during hot pressing, but reacts with zinc oxide formed during heating in hot pressing and forms a composite oxide with zinc oxide, and thus, it is assumed that thereby suppresses excessive oxidation and vaporization of zinc. As the oxide of alkaline-earth metal that can obtain this effect more efficiently, magnesium oxide or calcium oxide is preferably used.

In the case where the surface treatment layer contains magnesium oxide or calcium oxide, the content thereof is preferably more than or equal to 0.05 g/m$^2$ and less than or equal to 0.35 g/m$^2$ per one surface on a metal basis, and is more preferably more than or equal to 0.05 g/m$^2$ and less than or equal to 0.2 g/m$^2$ per one surface on a metal basis. In the case where the content of magnesium oxide or calcium oxide is less than 0.05 g/m$^2$ per one surface on a metal basis, a sufficient amount of a composite oxide with zinc oxide cannot be formed, and it may be difficult to efficiently suppress the oxidation and vaporization of Zn. On the other hand, in the case where the content of magnesium oxide or calcium oxide exceeds 0.35 g/m² per one surface on a metal basis, decrease in the cohesive force of the surface treatment layer may cause defects in adhesiveness.

The surface treatment layer according to the present embodiment may contain, in addition to oxides like the above, at least one of one or more P-containing compounds, one or more V-containing compounds, one or more Cu-containing compounds, one or more Al-containing compounds, and one or more Cr-containing compounds described in detail below in the range of a predetermined content.

The P-containing compound is a compound containing phosphorus as a constituent element. Examples of the P-containing compound include compounds such as phosphoric acid, phosphorous acid, phosphonic acid, phosphonous acid, phosphinic acid, phosphinous acid, a phosphine oxide, and phosphine, an ionic compound containing any of these compounds as an anion, and the like. All these P-containing compounds are commercially available as reagents or products, and can be easily obtained. These P-containing compounds exist in a state of being dissolved in a treatment liquid or in a state of being dispersed as powder in a treatment liquid, and exist, in the surface treatment layer, in a state of being dispersed as solid.

The V-containing compound is a compound containing vanadium as a constituent element. Examples of the V-containing compound include vanadium oxides such as vanadium pentoxide, metavanadic acid-based compounds such as ammonium metavanadate, vanadium compounds such as sodium vanadate, and other V-containing compounds. Those V-containing compounds are commercially available as reagents or products, and can be easily obtained. Those V-containing compounds exist in a state of being dissolved in a treatment liquid or in a state of being dispersed as powder in a treatment liquid, and exist, in the surface treatment layer, in a state of being dispersed as solid.

The surface treatment layer according to the present embodiment preferably contains one or more compounds selected from one or more P-containing compounds and one or more V-containing compounds mentioned above individually in the range of more than or equal to 0.0 g/m² and less than or equal to 0.01 g/m² per one surface on a P and V basis.

One or more compounds selected from one or more P-containing compounds and one or more V-containing compounds mentioned above are oxidized into an oxide during hot pressing, and the oxide exists locally at the interface between the hot-dip Zn-based plating layer and the surface treatment layer and forms an oxide layer that contains at least one of P and V and has weak cohesive force. Since the content of the one or more compounds selected from one or more P-containing compounds and one or more V-containing compounds contained is individually in the range of more than or equal to 0.0 g/m² and less than or equal to 0.01 g/m² per one surface on a P and V basis, the thickness of an oxide layer like the above that is formed during hot pressing and has weak cohesive force is reduced, and the adhesiveness between the hot-dip Zn-based plating layer and the surface treatment layer after hot pressing is further improved.

In the case where the content of the one or more selected from one or more P-containing compounds and one or more V-containing compounds in the surface treatment layer exceeds 0.01 g/m² per one surface, the thickness of the oxide layer that is formed during hot pressing and has weak cohesive force is increased; consequently, the adhesiveness between the hot-dip Zn-based plating layer and the surface treatment layer is reduced. As a result, the surface treatment layer easily peels off after hot pressing, and the surface treatment layer that has been peeled off may adhere to the mold for hot pressing. From the viewpoint of the adhesiveness between the hot-dip Zn-based plating layer and the surface treatment layer after hot pressing, the content of the one or more compounds selected from one or more P-containing compounds and one or more V-containing compounds in the surface treatment layer is more preferably individually more than or equal to 0.0 g/m² and less than or equal to 0.003 g/m² per one surface on a P and V basis.

The Cu-containing compound is a compound containing copper as a constituent element. Examples of the Cu-containing compound include metal Cu, copper oxide, various organic copper compounds, various inorganic copper compounds, and various copper complexes. Those Cu-containing compounds are commercially available as reagents or products, and can be easily obtained. Those Cu-containing compounds exist in a state of being dissolved in a treatment liquid or in a state of being dispersed as powder in a treatment liquid, and exist, in the surface treatment layer, in a state of being dispersed as solid.

The surface treatment layer according to the present embodiment preferably contains one or more compounds selected from one or more Cu-containing compounds mentioned above in the range of more than or equal to 0.0 g/m² and less than or equal to 0.02 g/m² per one surface on a Cu basis.

One or more compounds selected from one or more Cu-containing compounds mentioned above are oxidized into an oxide during hot pressing, and the oxide exists locally at the interface between the Zn-based plating layer and the surface treatment layer and forms an oxide layer that contains Cu and has weak cohesive force. Since the content of the one or more compounds selected from one or more Cu-containing compounds is in the range of more than or equal to 0.0 g/m² and less than or equal to 0.02 g/m² per one surface on a Cu basis, the thickness of an oxide layer like the above that is formed during hot pressing and has weak cohesive force is reduced, and the adhesiveness between the hot-dip Zn-based plating layer and the surface treatment layer after hot pressing is further improved.

In the case where the content of the one or more selected from one or more Cu-containing compounds in the surface treatment layer exceeds 0.02 g/m² per one surface, the thickness of the oxide layer that is formed during hot pressing and has weak cohesive force is increased; consequently, the adhesiveness between the hot-dip Zn-based plating layer and the surface treatment layer is reduced. As a result, the surface treatment layer easily peels off after hot pressing, and the surface treatment layer that has been peeled off may adhere to the mold for hot pressing. In addition, since Cu is an element nobler than Fe, which is a main component of the base steel sheet, also the corrosion resistance tends to decrease. From the viewpoint of the adhesiveness between the hot-dip Zn-based plating layer and the surface treatment layer after hot pressing, the content of the one or more compounds selected from one or more Cu-containing compounds in the surface treatment layer is more preferably more than or equal to 0.0 g/m² and less than or equal to 0.005 g/m² per one surface on a Cu basis.

The Al-containing compound is a compound containing aluminum as a constituent element. Examples of the Al-containing compound include metal Al, aluminum oxide, aluminum hydroxide, an ionic compound containing an aluminum ion as a cation, and the like. Those Al-containing compounds are commercially available as reagents or products, and can be easily obtained. Those Al-containing compounds exist in a state of being dissolved in a treatment liquid or in a state of being dispersed as powder in a treatment liquid, and exist, in the surface treatment layer, in a state of being dispersed as solid.

The surface treatment layer according to the present embodiment preferably contains one or more compounds selected from one or more Al-containing compounds mentioned above in the range of more than or equal to 0.0 g/m$^2$ and less than or equal to 0.005 g/m$^2$ per one surface on an Al basis.

One or more compounds selected from one or more Al-containing compounds mentioned above are oxidized into an oxide during hot pressing, and the oxide concentrates on the surface of the surface treatment layer. Since the content of the one or more compounds selected from one or more Al-containing compounds is in the range of more than or equal to 0.0 g/m$^2$ and less than or equal to 0.005 g/m$^2$ per one surface on an Al basis, the existence ratio of the oxides containing Al that are formed on the surface of the surface treatment layer during hot pressing is reduced, and those oxides containing Al can be prevented from being adhered to the mold for hot pressing.

In the case where the content of the one or more selected from one or more Al-containing compounds in the surface treatment layer exceeds 0.005 g/m$^2$ per one surface, the existence ratio of the oxides containing Al that are formed during hot pressing is increased. Those oxides containing Al adhere to the mold for hot pressing and inhibit the formation of a chemical conversion treatment coating film; therefore, when the existence ratio of the oxides containing Al that are formed during hot pressing is increased, adhesion of the oxides containing Al to the mold for hot pressing increases, and the operability is deteriorated. From the viewpoint of the operability, the content of the one or more compounds selected from one or more Al-containing compounds in the surface treatment layer is more preferably more than or equal to 0.0 g/m$^2$ and less than or equal to 0.002 g/m$^2$ per one surface on an Al basis.

The Cr-containing compound is a compound containing chromium as a constituent element. Examples of the Cr-containing compound include metal Cr, chromium compounds having various valences, and an ionic compound containing a chromium ion having any of various valences as a cation. Those Cr-containing compounds exist in a state of being dissolved in a treatment liquid or in a state of being dispersed as powder in a treatment liquid, and exist, in the surface treatment layer, in a state of being dispersed as solid.

The Cr-containing compound varies in performance and properties in accordance with the valence, and many hexavalent chromium compounds are harmful. As mentioned above, in view of the current tendency of attention to environmental protection being strongly required, the surface treatment layer according to the present embodiment preferably contains as little amount of Cr-containing compounds mentioned above as possible, and is more preferably chromium-free.

From the above point of view, the surface treatment layer according to the present embodiment preferably contains one or more compounds selected from one or more Cr-containing compounds mentioned above in the range of more than or equal to 0.0 g/m$^2$ and less than or equal to 0.01 g/m$^2$ per one surface on a Cr basis, and more preferably contains no Cr-containing compound.

As the method for forming the surface treatment layer, a treatment liquid containing the granular oxide satisfying the condition of the standard free energy of formation described above may be applied to the surface of a zinc-plated steel sheet, and drying and baking may be performed.

The coating method is not limited to a specific method, and examples include a method in which a base steel sheet is dipped in a treatment liquid or a treatment liquid is sprayed to the surface of a base steel sheet, and then the attached amount is controlled by a roll or gas spraying so as to obtain a prescribed attached amount, and a method of coating using a roll coater or a bar coater.

The method of drying and baking is not limited to a specific method, either, as long as it is a method that can volatilize a dispersion medium (mainly water). Here, if heating is performed at an excessively high temperature, it is feared that the uniformity of the surface treatment layer will be reduced; conversely, if heating is performed at an excessively low temperature, it is feared that productivity will be reduced. Thus, to produce a surface treatment layer having excellent characteristics stably and efficiently, the surface treatment layer after coating is preferably heated at a temperature of approximately 80° C. to 150° C. for approximately 5 seconds to 20 seconds.

The formation of the surface treatment layer is preferably performed in-line in the production line of the plated steel sheet because this is economical; but the surface treatment layer may be formed also in another line, or may be formed after blanking for molding is performed.

Here, the content of above-mentioned one or more P-containing compounds, one or more V-containing compounds, one or more Cu-containing compounds, one or more Al-containing compounds, one or more Si-containing compounds, and one or more Cr-containing compounds in the surface treatment layer can be measured by a known method; for example, the fact that the various compounds included in the surface treatment layer are the above-mentioned compounds of attention is checked beforehand by cross-sectional energy dispersive X-ray (EDX) analysis or the like, and then the coating film is dissolved; thus, the measurement can be made using inductively coupled plasma (ICP) emission spectrometric analysis or the like.

<2. Regarding Hot Pressing Process>

In the case where the hot pressing method is used for a hot-dip zinc-based plated steel sheet like that described above, the hot-dip zinc-based plated steel sheet is heated to a prescribed temperature, and is then press-molded. In the case of the hot-dip zinc-based plated steel sheet according to the present embodiment, heating is usually performed to 700 to 1000° C. because hot press molding is performed; but in the case where a martensite single phase is formed after rapid cooling or martensite is formed at a volume ratio of 90% or more, it is important that the lower limit of the heating temperature be the Ac$_3$ point or more. In the case of the present invention, also the case where a two-phase region of martensite/ferrite is formed after rapid cooling is included, and therefore the heating temperature is preferably 700 to 1000° C. as described above.

Examples of the hot pressing method include two methods of hot pressing by slow heating and hot pressing by rapid heating. Examples of the heating method used include heating with an electric furnace or a gas furnace, flame heating, energization heating, high-frequency heating, and induction heating, and the atmosphere during heating is not particularly limited; as a heating method to obtain the effect of the present invention significantly, energization heating, induction heating, and the like, which are rapid heating, are preferably used.

In the hot pressing method by slow heating, the radiation heating of a heating furnace is used. First, the hot-dip zinc-based plated steel sheet according to the present embodiment that is used as a steel sheet for hot pressing is placed in a heating furnace (a gas furnace, an electric furnace, or the like). The steel sheet for hot pressing is heated at 700 to 1000° C. in the heating furnace, and is, depending on the condition, kept at this heating temperature (soaking). Thereby, molten Zn in the hot-dip zinc-based plating layer is combined with Fe and forms a solid phase (Fe—Zn solid solution phase). After the molten Zn in the hot-dip zinc-based plating layer is combined with Fe and forms a solid phase, the steel sheet is taken out of the heating furnace. Alternatively, by combining molten Zn in the hot-dip zinc-based plating layer with Fe by soaking, the solid phase may be formed as an Fe—Zn solid solution phase and a ZnFe alloy phase; and then the steel sheet may be taken out of the heating furnace.

Alternatively, the hot-dip zinc-based plated steel sheet may be heated to 700 to 1000° C. while no keeping time is provided or the keeping time is set to a short time, and the steel sheet may be taken out of the heating furnace. In this case, after the steel sheet is heated to 700 to 1000° C., cooling is performed without applying stress to the steel sheet by press molding or the like until molten Zn in the hot-dip zinc-based plating layer is combined with Fe and forms a solid phase (Fe—Zn solid solution phase or ZnFe alloy phase). Specifically, cooling is performed until at least the temperature of the steel sheet becomes the temperature at which the hot-dip zinc-based plating layer forms a solid phase. For example, in the hot-dip galvanized layer and the alloyed hot-dip galvanized layer, cooling is performed until the temperature of the steel sheet becomes lower than or equal to 782° C. After the cooling, as described below, cooling is performed while the steel sheet is pressed using a mold. On the other hand, in the case where the heating temperature is lower than or equal to 782° C., since the hot-dip zinc-based plating layer stays as the solid phase, press molding may be quickly performed after the steel sheet is taken out of the heating furnace.

Also in hot pressing by rapid heating, similarly, the hot-dip zinc-based plated steel sheet according to the present embodiment that is used as a steel sheet for hot pressing is rapidly heated to 700 to 1000° C. The rapid heating is performed by, for example, energization heating or induction heating. The average heating rate in this case is 20° C./second or more. In the ease of rapid heating, after the hot-dip zinc-based plated steel sheet is heated to 700 to 1000° C., cooling is performed without applying stress to the steel sheet by press molding or the like until molten Zn in the hot-dip zinc-based plating layer is combined with Fe and forms a solid phase (Fe—Zn solid solution phase or ZnFe alloy phase). Specifically, cooling is performed until at least the temperature of the steel sheet becomes the temperature at which the hot-dip zinc-based plating layer forms a solid phase. For example, in the hot-dip galvanized layer and the alloyed hot-dip galvanized layer, cooling is performed until the temperature of the steel sheet becomes lower than or equal to 782° C. After the cooling, as described below, cooling is performed while the steel sheet is pressed using a mold. In the case where the heating temperature is lower than or equal to 782° C., since the hot-dip zinc-based plating layer stays as the solid phase, press molding may be quickly performed after the steel sheet is taken out of the heating furnace.

The taken-out steel sheet is pressed using a mold. When pressing the steel sheet, the steel sheet is cooled by the mold. A cooling medium (for example, water or the like) is circulated through the mold, and the mold removes heat from the steel sheet and cools it. By the above process, a hot pressed steel material is produced by normal heating.

The hot pressed steel material produced using the hot-dip zinc-based plated steel sheet including the surface treatment layer according to the present embodiment has excellent durability.

In the case where hot pressing by normal heating is performed using a conventional plated steel sheet, the steel sheet is soaked in a heating furnace. In this case, although a zinc oxide film is formed on the outer layer of the plating layer of the steel sheet for hot pressing, a larger amount of the zinc oxide film is formed due to long time soaking heating, and the amount of metal zinc remained in the coating film after hot pressing decreases. Accordingly, compared to the galvanized steel material before heating, the corrosion resistance at an uncoated portion of the hot pressed steel material may decrease significantly.

However, the hot-dip zinc-based plated steel sheet according to the present embodiment contains, in the surface treatment layer, the granular oxide satisfying the condition of the standard free energy of formation described above, and thereby suppresses the production of zinc oxide during hot pressing and ensures amount of metal zinc after hot pressing; and can thus exhibit satisfactory corrosion resistance at an uncoated portion.

EXAMPLES

The action and effect of the hot-dip zinc-based plated steel sheet according to an embodiment of the present invention will now be described still more specifically with reference to Examples. Examples shown below are only examples of the hot-dip zinc-based plated steel sheet according to the present invention, and the hot-dip zinc-based plated steel sheet according to the present invention is not limited to Examples below.

<Base Steel Sheet>

In the following, first, pieces of molten steel having the chemical compositions shown in Table 1 below were produced. After that, the produced pieces of molten steel were used to produce slabs by the continuous casting method. The obtained slab was hot rolled to produce a hot rolled steel sheet. Subsequently, the hot rolled steel sheet was pickled, and then cold rolling was performed to produce a cold rolled steel sheet; thus, steel sheets of steel #1 to #8 having the chemical compositions described in Table 1 were prepared. As shown in Table 1, the sheet thicknesses of the steel sheets of all the steel types were 1.6 mm.

TABLE 1

| Type of steel | Sheet thickness (mm) | Chemical composition (mass %, the balance: Fe and impurities) | | | | | | | | | | | | |
|---|---|---|---|---|---|---|---|---|---|---|---|---|---|---|
| | | C | Si | Mn | P | S | sol. Al | N | B | Ti | Cr | Mo | Nb | Ni |
| #1 | 1.6 | 0.2 | 0.2 | 1.3 | 0.01 | 0.005 | 0.02 | 0.002 | 0.002 | 0.02 | 0.2 | — | — | — |
| #2 | 1.6 | 0.2 | 0.5 | 1.3 | 0.01 | 0.005 | 0.02 | 0.002 | 0.002 | 0.02 | 0.2 | — | — | — |
| #3 | 1.6 | 0.2 | 0.5 | 1.3 | 0.01 | 0.005 | 0.02 | 0.002 | 0.002 | 0.02 | 0.2 | — | 0.05 | — |
| #4 | 1.6 | 0.2 | 0.5 | 1.3 | 0.01 | 0.005 | 0.02 | 0.002 | 0.002 | 0.02 | 0.2 | — | — | 1.0 |
| #5 | 1.6 | 0.2 | 0.5 | 1.3 | 0.01 | 0.005 | 0.02 | 0.002 | 0.002 | 0.02 | 0.2 | 0.5 | — | — |
| #6 | 1.6 | 0.2 | 0.5 | 1.3 | 0.01 | 0.005 | 0.02 | 0.002 | — | — | — | — | — | — |
| #7 | 1.6 | 0.2 | 0.2 | 0.2 | 0.01 | 0.005 | 0.02 | 0.002 | 0.002 | 0.02 | 0.2 | — | — | — |
| #8 | 1.6 | 0.2 | 0.2 | 0.4 | 0.01 | 0.005 | 0.02 | 0.002 | 0.002 | 0.02 | 0.2 | — | — | — |

<Hot-Dip Zinc-Based Plating Layer>

The steel sheets of steel #1 to #8 were subjected to hot-dip galvanizing treatment, and were then subjected to alloying treatment. With the maximum temperature in each alloying treatment set to 530° C., heating was performed for approximately 30 seconds; and then cooling was performed to room temperature; thus, an alloyed hot-dip galvanized steel sheet (GA) was produced. Using steel #1, hot-dip galvanizing treatment was performed, and a hot-dip galvanized steel sheet (GI) was produced without performing alloying treatment.

Further, steel #1 was subjected to various types of hot-dip galvanizing using three types of plating baths of hot-dip Zn-55% Al plating, hot-dip Zn-6% Al-3% Mg plating, and hot-dip Zn-11% Al-3% Mg-0.2% Si plating, and hot-dip zinc-based plated steel sheets A1 to A3 were produced.

A1: hot-dip Zn-55% Al plating
A2: hot-dip Zn-6% Al-3% Mg plating
A3: hot-dip Zn-11% Al-3% Mg-0.2% Si plating Further, steel #1 was subjected to zinc electroplating treatment, and a zinc electroplated steel sheet (EG) was produced.

Here, the amount of the hot-dip zinc-based plating layer attached to the hot-dip zinc-based plated steel sheet was set to 50 g/m$^2$.

Note that the Al concentration in the plating coating film of the hot-dip galvanized steel sheet described above was found by the following method. That is, a sample was collected from each hot-dip zinc-based plated steel sheet. The hot-dip zinc-based plating layer of the collected sample was dissolved in a 10% HCl aqueous solution, and the composition of the hot-dip zinc-based plating layer was analyzed by ICP emission spectrometric analysis. The Al concentration (mass %) per one surface was determined on the basis of the obtained analysis result. The obtained results are collectively shown in Table 3 below.

<Surface Treatment Layer>

Subsequently, in order to form coating films having the compositions and the attached amounts shown in Table 2, oxides and chemical agents were blended using water. The oxides in powder state were used after the powder is dispersed in resin-added water and the powder is pulverized using a ball mill to a degree so as to be dispersed in the resin dispersed solution. The obtained treatment liquid was applied with a bar coater, and drying was performed using an oven under conditions for keeping a maximum peak temperature of 100° C. for 8 seconds; thus, a plated steel sheet for hot pressing was produced. The amount of the treatment liquid attached was adjusted by the dilution of the liquid and the count of the bar coater so that the amount of oxides attached to the surface treatment layer per one surface on a metal basis might be the numerical values shown in Table 2.

The components (symbols) in Table 2 are as follows.
(i) Oxide, Etc.: Oxide of Ti, Oxide of Si
  TPA: titania powder (manufactured by IoLiTec GmbH), particle size 10 to 30 nm (catalog value)
  TPB: titania powder (TITANIX JA-1, manufactured by Tayca Corporation), particle size: 180 nm (catalog value)
  TZ: titania sol (titania sol TKS-203, manufactured by Tayca Corporation), particle size: 6 nm (catalog value)
  SZ: silica sol (Snowtex ST-C, manufactured by Nissan Chemical Industries, Ltd.), particle size: 10 to 20 nm (catalog value)
  MP: manganese oxide ($Mn_3O_4$) powder (manufactured by IOX Co., Ltd.), average particle size: 25 nm (catalog value)
  Note that the above-mentioned five oxides are each a substance in which the standard free energy of formation ($\Delta G^0$) is smaller than the standard free energy of formation ($\Delta G^0_{Zn}$) of ZnO and larger than the standard free energy of formation ($\Delta G^0_{Al}$) of $Al_2O_3$ at an identical temperature.
(ii) Alkaline Earths: Oxide of Alkaline-Earth Metal
  Mg: Mg oxide (magnesium oxide, manufactured by Japan Pure Chemical Co., Ltd.)
  Ca: Ca oxide (calcium oxide, manufactured by Japan Pure Chemical Co., Ltd.)
  Sr: Sr oxide (strontium oxide, manufactured by Japan Pure Chemical Co., Ltd.)
(iii) Resin
  A: a urethane-based resin emulsion (Superflex (registered trademark) E-2000, manufactured by DKS Co. Ltd.)
  B: a urethane-based resin emulsion (Superflex (registered trademark) 150, manufactured by DKS Co. Ltd.)
  C: a polyester resin emulsion (Vylonal (registered trademark) MD1480, manufactured by Toyobo Co., Ltd.)
(iv) Crosslinking Agent
  M: a melamine resin (Cymel (registered trademark) 325, manufactured by Mitsui Cytec Ltd.)
  Z: ammonium zirconium carbonate (an ammonium zirconium carbonate solution, manufactured by Kishida Chemical Co., Ltd.)
  S: a silane coupling agent (Sila-Ace S510, manufactured by Nichibi Trading Co., LTD.)
(v) Pigment
  PZ: zinc phosphite (NP-530, manufactured by Toho Ganryo Co., Ltd.) (P-containing compound)
  Al: an alumina sol (AS-200, manufactured by Nissan Chemical Industries, Ltd.) (Al-containing compound)
  V: potassium vanadate (general reagent) (V-containing compound)
  Cr: Cr(VI) oxide (general reagent) (Cr-containing compound)
  Cu: copper(II) oxide (general reagent) (Cu-containing compound)

TABLE 2

| | Oxide, etc. | | Alkaline-earth metal | | Resin | | Crosslinking agent/ Pigment | |
|---|---|---|---|---|---|---|---|---|
| | Type | Concentration (mass %) | Type | Concentration (mass %) | Type | Concentration (mass %) | Type | Concentration (mass %) |
| S1 | SZ | 100 | — | 0 | — | 0 | — | 0 |
| S2 | SZ | 80 | — | 0 | A | 20 | — | 0 |
| S3 | SZ | 40 | — | 0 | A | 60 | — | 0 |
| S4 | SZ | 20 | — | 0 | A | 80 | — | 0 |
| S5 | SZ | 50 | — | 0 | A | 50 | — | 0 |
| S6 | SZ | 50 | — | 0 | A | 45 | Z | 5 |
| S7 | SZ | 50 | — | 0 | A | 45 | S | 5 |
| S8 | SZ | 50 | Mg | 10 | A | 35 | Z | 5 |
| S9 | SZ | 50 | Mg | 10 | A | 35 | S | 5 |
| S10 | SZ | 50 | Mg | 5 | A | 45 | — | 0 |
| S11 | SZ | 50 | Mg | 10 | A | 40 | — | 0 |
| S12 | SZ | 50 | Mg | 20 | A | 30 | — | 0 |
| S13 | SZ | 50 | Mg | 30 | A | 20 | — | 0 |
| S14 | SZ | 50 | Ca | 10 | A | 35 | S | 5 |
| S15 | SZ | 50 | Ca | 10 | A | 35 | Z | 5 |
| S16 | SZ | 50 | Sr | 10 | A | 35 | S | 5 |
| S17 | SZ | 80 | — | 0 | B | 20 | — | 0 |
| S18 | SZ | 80 | — | 0 | C | 20 | — | 0 |
| T1 | TPA | 100 | — | 0 | — | 0 | — | 0 |
| T2 | TPA | 80 | — | 0 | B | 20 | — | 0 |
| T3 | TPA | 40 | — | 0 | B | 60 | — | 0 |
| T4 | TPA | 20 | — | 0 | B | 80 | — | 0 |
| T5 | TPA | 50 | — | 0 | B | 50 | — | 0 |
| T6 | TPA | 50 | — | 0 | B | 45 | Z | 5 |
| T7 | TPA | 50 | — | 0 | B | 45 | S | 5 |
| T8 | TPA | 50 | Mg | 10 | B | 35 | Z | 5 |
| T9 | TPA | 50 | Mg | 10 | B | 35 | S | 5 |
| T10 | TPA | 50 | Mg | 5 | B | 45 | — | 0 |
| T11 | TPA | 50 | Mg | 10 | B | 40 | — | 0 |
| T12 | TPA | 50 | Mg | 20 | B | 30 | — | 0 |
| T13 | TPA | 50 | Mg | 30 | B | 20 | — | 0 |
| T14 | TPA | 50 | Ca | 10 | B | 35 | S | 5 |
| T15 | TPA | 50 | Ca | 10 | B | 35 | Z | 5 |
| T16 | TPA | 50 | Sr | 10 | B | 35 | S | 5 |
| T17 | TPA | 50 | — | 0 | C | 45 | M | 5 |
| T18 | TPB | 80 | — | 0 | B | 20 | — | 0 |
| T19 | TZ | 100 | — | 0 | — | 0 | — | 0 |
| T20 | TZ | 80 | — | 0 | A | 20 | — | 0 |
| T21 | TZ | 50 | — | 0 | A | 50 | — | 0 |
| T22 | TZ | 50 | Mg | 10 | A | 40 | — | 0 |
| T23 | TZ | 50 | Mg | 10 | B | 35 | S | 5 |
| T24 | TZ | 50 | Ca | 10 | B | 40 | — | 0 |
| T25 | TZ | 50 | Ca | 10 | B | 35 | Z | 5 |
| M1 | MP | 50 | — | 0 | A | 50 | — | 0 |
| C1 | — | 0 | — | 0 | B | 100 | — | 0 |
| C2 | — | 0 | — | 0 | — | 0 | — | 0 |
| S19 | SZ | 50 | — | 0 | A | 49 | Al | 1 |
| S20 | SZ | 50 | — | 0 | A | 49.5 | Al | 0.5 |
| S21 | SZ | 50 | — | 0 | A | 49.8 | Al | 0.2 |
| S22 | SZ | 50 | — | 0 | A | 46 | PZ | 4 |
| S23 | SZ | 50 | — | 0 | A | 48 | PZ | 2 |
| S24 | SZ | 50 | — | 0 | A | 49.5 | PZ | 0.5 |
| S25 | SZ | 50 | — | 0 | A | 48 | V | 2 |
| S26 | SZ | 50 | — | 0 | A | 49 | V | 1 |
| S27 | SZ | 50 | — | 0 | A | 49.6 | V | 0.4 |
| S28 | SZ | 50 | — | 0 | A | 48 | Cu | 2 |
| S29 | SZ | 50 | — | 0 | A | 49 | Cu | 1 |
| S30 | SZ | 50 | — | 0 | A | 49.7 | Cu | 0.3 |
| S31 | SZ | 50 | — | 0 | A | 48 | Cr | 2 |
| S32 | SZ | 50 | — | 0 | A | 49 | Cr | 1 |
| T26 | TPA | 50 | — | 0 | B | 49 | Al | 1 |
| T27 | TPA | 50 | — | 0 | B | 49.5 | Al | 0.5 |
| T28 | TPA | 50 | — | 0 | B | 49.8 | Al | 0.2 |
| T29 | TPA | 50 | — | 0 | B | 46 | PZ | 4 |
| T30 | TPA | 50 | — | 0 | B | 48 | PZ | 2 |
| T31 | TPA | 50 | — | 0 | B | 49.5 | PZ | 0.5 |
| T32 | TPA | 50 | — | 0 | B | 48 | V | 2 |
| T33 | TPA | 50 | — | 0 | B | 49 | V | 1 |
| T34 | TPA | 50 | — | 0 | B | 49.6 | V | 0.4 |
| T35 | TPA | 50 | — | 0 | B | 48 | Cu | 2 |
| T36 | TPA | 50 | — | 0 | B | 49 | Cu | 1 |
| T37 | TPA | 50 | — | 0 | B | 49.7 | Cu | 0.3 |

TABLE 2-continued

|  | Oxide, etc. | | Alkaline-earth metal | | Resin | | Crosslinking agent/ Pigment | |
|---|---|---|---|---|---|---|---|---|
|  | Type | Concentration (mass %) | Type | Concentration (mass %) | Type | Concentration (mass %) | Type | Concentration (mass %) |
| T38 | TPA | 50 | — | 0 | B | 48 | Cr | 2 |
| T39 | TPA | 50 | — | 0 | B | 49 | Cr | 1 |

<Hot Pressing Process>

After the formation process of the surface treatment layer, the steel sheet of each test number was subjected to hot press heating by a heating system of furnace heating, and thus hot pressing was performed. In the furnace heating, the atmosphere in the furnace was set to 910° C. and the air-fuel ratio was set to 1.1, and the steel sheet was taken out of the furnace immediately after the temperature of the steel sheet reached 900° C.

After the hot press heating, cooling was performed until the temperature of the steel sheet became 700° C. After the cooling, the steel sheet was sandwiched by a flat sheet mold equipped with a water cooling jacket, and thus a hot pressed steel material (steel sheet) was produced. Cooling was performed up to approximately 360° C., which is the martensite transformation starting point, so as to ensure a cooling rate of 50° C./second or more even in a portion where the cooling rate had been low during the hot pressing, and thus quenching was performed.

<Evaluation Method>

[Measurement of Amount of Zinc Oxide]

As a method of measuring a zinc oxide layer by chemical analysis, there may be used: a method involving dissolving a plating layer in a 5% iodine-methanol solution, dissolving the produced residue in hydrochloric acid, and performing the measurement; and a method involving dissolving an oxide film on the surface using an ammonium bichromate aqueous solution and performing the measurement. Here, the dissolved solutions can be measured using blanks of the respective solutions through emission analysis such as inductively coupled plasma atomic emission spectroscopy.

As a method of measuring a zinc oxide layer by physical analysis, the peak intensity derived from ZnO may be determined using X-ray diffraction. In this case, by preparing in advance a calibration curve showing a relationship between the amount of zinc oxide and the peak intensity derived from ZnO using a standard sample in which the amount of zinc oxide is known, the amount of produced zinc oxide can be measured from the peak intensity of a specific diffraction plane.

In the present embodiment, an X-ray diffractometer with a Co anode was used, and the amount of produced zinc oxide was calculated from a diffraction peak intensity on the [100] plane of ZnO on the basis of Formula (1) below.

$$\text{Amount of produced zinc oxide} = XZ - XZ0 \quad \text{Formula (1)}$$

Here, in Formula (1) above, XZ represents a diffraction peak intensity on the ZnO [100] plane after hot press heating, and XZ0 represents a diffraction peak intensity on the ZnO [100] plane before hot press heating. As compared to GA with no surface treatment layer and the zinc-based plated steel sheet which were carried out as comparative examples, the case where the determined amount of produced zinc oxide was almost none was evaluated as A, the case where the determined amount of produced zinc oxide was small was evaluated as B, and the case where the determined amount of produced zinc oxide was large was evaluated as C.

[Corrosion Resistance Test]

An end face and a back surface of an evaluation test piece were masked with a polyester tape, and a cycle corrosion test of the following cycle conditions was performed 90 cycles.

Cycle Conditions

A cycle corrosion test was performed in which a procedure of two hours of salt water spraying (SST; 5% NaCl; atmosphere: 35° C.), then two hours of drying (60° C.), and then four hours of wetting (50° C.; RH: 98%) was taken as one cycle.

After that, the polyester tape was removed, and then a corrosion product was dissolved in an ammonium citrate solution and was removed. An evaluation plane was divided into eight equal sections, the thickness of a corrosion part in each section was measured with a pin point micrometer, and thickness reduction due to corrosion in each section was determined from a difference with an unaffected part which had been masked. An average of the top three values among the determined thickness reduction values of the respective sections was calculated, and the calculated average was used as a corrosion depth of each test piece.

"G" of the "Corrosion resistance" section in Table 3 means that a corrosion depth exceeding 0.5 mm occurred. "F" means that a corrosion depth of more than or equal to 0.4 mm and less than 0.5 mm occurred. "E" means that a corrosion depth of more than or equal to 0.3 mm and less than 0.4 mm occurred. "D" means that a corrosion depth of more than or equal to 0.2 mm and less than 0.3 mm occurred. "C" means that a corrosion depth of more than or equal to 0.15 mm and less than 0.2 mm occurred. "B" means that a corrosion depth of more than or equal to 0.10 mm and less than 0.15 mm occurred. "A" means that a corrosion depth of less than or equal to 0.10 mm occurred. The case of "F", "E", "D", "C", "B" or "A" in the corrosion resistance test was assessed as excellent in corrosion resistance.

[Adhesion Resistance Test]

Quantification was performed by measuring, as an index for quantifying adhesion to a mold, adhesion of the coating film to the surface of the steel sheet obtained by hot pressing using the above-mentioned flat sheet mold.

To be specific, on the surface of the obtained steel sheet, a peeling test of the outer layer coating film after hot press molding was performed using a polyester tape manufactured by Nichiban Co., Ltd. In this case, a peeled amount of the peeling tape was used as a transmittance of a substrate, and was evaluated as a lightness index using Chroma Meter CR-300 manufactured by Minolta Co., Ltd. The evaluation was performed as follows. The case where N=3 average (L*ave) of a lightness index L* was less than or equal to 55 was evaluated as "C", which indicates that a large amount of the outer layer coating film was peeled off and the adhesion resistance to the mold was poor. Further, the case where L*ave was larger than 55 and less than or equal to 60 was evaluated as "B", and the case where L*ave was larger than 60 was evaluated as "A". For "A" and "B", the peeling off of the outer layer coating film was suppressed, and "A" and "B" were each assessed as excellent in adhesion resistance to the mold.

TABLE 3

| | Steel type | Zinc-based plating layer Type | Al concentration (mass %) | Surface treatment layer Type | Attached amount of oxide, etc., on metal basis (g/m$^2$) | Attached amount of alkaline-earths on metal basis (g/m$^2$) | ZnO suppression | Corrosion resistance | Mold-adhesion resistance | Notes |
|---|---|---|---|---|---|---|---|---|---|---|
| 1 | #1 | GA | 0.2 | S5 | 0.8 | | B | D | A | |
| 2 | #2 | GA | 0.2 | S5 | 0.8 | | B | D | A | |
| 3 | #3 | GA | 0.2 | S5 | 0.8 | | B | D | A | |
| 4 | #4 | GA | 0.2 | S5 | 0.8 | | B | D | A | |
| 5 | #5 | GA | 0.2 | S5 | 0.8 | | B | D | A | |
| 6 | #6 | GA | 0.2 | S5 | 0.8 | | B | D | A | |
| 7 | #7 | GA | 0.2 | S5 | 0.8 | | B | D | C | |
| 8 | #8 | GA | 0.2 | S5 | 0.8 | | B | D | B | |
| 9 | #1 | GA | 0.2 | T5 | 0.8 | | B | D | A | |
| 10 | #2 | GA | 0.2 | T5 | 0.8 | | B | D | A | |
| 11 | #3 | GA | 0.2 | T5 | 0.8 | | B | D | A | |
| 12 | #4 | GA | 0.2 | T5 | 0.8 | | B | D | A | |
| 13 | #5 | GA | 0.2 | T5 | 0.8 | | B | D | A | |
| 14 | #6 | GA | 0.2 | T5 | 0.8 | | B | D | A | |
| 15 | #7 | GA | 0.2 | T5 | 0.8 | | B | D | A | |
| 16 | #8 | GA | 0.2 | T5 | 0.8 | | B | D | A | |
| 17 | #1 | GI | 0.4 | T1 | 0.8 | | B | A | A | |
| 18 | #1 | GI | 0.4 | T2 | 0.8 | | B | A | A | |
| 19 | #1 | GI | 0.4 | T3 | 0.8 | | B | A | A | |
| 20 | #1 | GI | 0.4 | T4 | 0.8 | | B | D | A | |
| 21 | #1 | GI | 0.4 | S5 | 0.8 | | B | A | A | |
| 22 | #1 | GI | 0.4 | T5 | 0.8 | | B | A | A | |
| 23 | #1 | GI | 0.4 | T5 | 0.05 | | C | G | B | Comparative Example |
| 24 | #1 | GI | 0.4 | T5 | 0.2 | | B | A | A | |
| 25 | #1 | GI | 0.4 | T5 | 1.2 | | B | A | A | |
| 26 | #1 | GI | 0.4 | T5 | 2 | | B | G | B | Comparative Example |
| 27 | #1 | GA | 0.2 | T5 | 0.05 | | C | G | B | Comparative Example |
| 28 | #1 | GA | 0.2 | T5 | 0.2 | | B | A | A | |
| 29 | #1 | GA | 0.2 | T5 | 1.2 | | B | A | A | |
| 30 | #1 | GA | 0.2 | T5 | 2 | | B | G | B | Comparative Example |
| 31 | #1 | GA | 0.2 | S1 | 0.8 | | B | D | A | |
| 32 | #1 | GA | 0.2 | S2 | 0.8 | | B | D | A | |
| 33 | #1 | GA | 0.2 | S3 | 0.8 | | B | D | A | |
| 34 | #1 | GA | 0.2 | S4 | 0.8 | | B | D | A | |
| 35 | #1 | GA | 0.2 | S6 | 0.8 | | B | D | A | |
| 36 | #1 | GA | 0.2 | S7 | 0.8 | | B | D | A | |
| 37 | #1 | GA | 0.2 | S8 | 0.8 | 0.2 | A | D | A | |
| 38 | #1 | GA | 0.2 | S9 | 0.8 | 0.2 | A | D | A | |
| 39 | #1 | GA | 0.2 | S10 | 0.8 | 0.025 | B | D | A | |
| 40 | #1 | GA | 0.2 | S11 | 0.8 | 0.2 | A | D | A | |
| 41 | #1 | GA | 0.2 | S12 | 0.8 | 0.3 | A | D | A | |
| 42 | #1 | GA | 0.2 | S13 | 0.8 | 0.4 | B | D | A | |
| 43 | #1 | GA | 0.2 | S14 | 0.8 | 0.2 | A | D | A | |
| 44 | #1 | GA | 0.2 | S15 | 0.8 | 0.2 | A | D | A | |
| 45 | #1 | GA | 0.2 | S16 | 0.8 | 0.2 | A | D | A | |
| 46 | #1 | GA | 0.2 | S17 | 0.8 | | B | D | A | |
| 47 | #1 | GA | 0.2 | S18 | 0.8 | | B | D | A | |
| 48 | #1 | GA | 0.2 | T1 | 0.8 | | B | D | A | |
| 49 | #1 | GA | 0.2 | T2 | 0.8 | | B | D | A | |
| 50 | #1 | GA | 0.2 | T3 | 0.8 | | B | D | A | |
| 51 | #1 | GA | 0.2 | T4 | 0.8 | | B | D | A | |
| 52 | #1 | GA | 0.2 | T6 | 0.8 | | B | D | A | |
| 53 | #1 | GA | 0.2 | T7 | 0.8 | | B | D | A | |
| 54 | #1 | GA | 0.2 | T8 | 0.8 | 0.2 | A | D | A | |
| 55 | #1 | GA | 0.2 | T9 | 0.8 | 0.2 | A | D | A | |
| 56 | #1 | GA | 0.2 | T10 | 0.8 | 0.025 | B | D | A | |
| 57 | #1 | GA | 0.2 | T11 | 0.8 | 0.2 | A | D | A | |
| 58 | #1 | GA | 0.2 | T12 | 0.8 | 0.3 | A | D | A | |
| 59 | #1 | GA | 0.2 | T13 | 0.8 | 0.4 | B | D | A | |
| 60 | #1 | GA | 0.2 | T14 | 0.8 | 0.2 | A | D | A | |
| 61 | #1 | GA | 0.2 | T15 | 0.8 | 0.2 | A | D | A | |
| 62 | #1 | GA | 0.2 | T16 | 0.8 | 0.2 | A | D | A | |
| 63 | #1 | GA | 0.2 | T17 | 0.8 | | B | D | A | |
| 64 | #1 | GA | 0.2 | T18 | 0.8 | | C | G | B | Comparative Example |
| 65 | #1 | GA | 0.2 | T19 | 0.8 | | B | D | A | |
| 66 | #1 | GA | 0.2 | T20 | 0.8 | | B | D | A | |
| 67 | #1 | GA | 0.2 | T21 | 0.8 | | B | D | A | |
| 68 | #1 | GA | 0.2 | T22 | 0.8 | 0.2 | A | D | A | |
| 69 | #1 | GA | 0.2 | T23 | 0.8 | 0.2 | A | D | A | |
| 70 | #1 | GA | 0.2 | T24 | 0.8 | 0.2 | A | D | A | |
| 71 | #1 | GA | 0.2 | T25 | 0.8 | 0.2 | A | D | A | |
| 72 | #1 | GA | 0.2 | M1 | 0.8 | | B | D | A | |
| 73 | #1 | EG | 0 | S5 | 0.8 | | C | G | B | Comparative Example |

TABLE 3-continued

| | | Zinc-based plating layer | | Surface treatment layer | | | | | |
| --- | --- | --- | --- | --- | --- | --- | --- | --- | --- |
| | Steel type | Type | Al concentration (mass %) | Type | Attached amount of oxide, etc., on metal basis (g/m$^2$) | Attached amount of alkaline-earths on metal basis (g/m$^2$) | ZnO suppression | Corrosion resistance | Mold-adhesion resistance | Notes |
| 74 | #1 | EG | 0 | T5 | 0.8 | | C | G | B | Comparative Example |
| 75 | #1 | EG | 0 | C2 | 0 | | C | G | C | Comparative Example |
| 76 | #1 | A1 | 55 | T5 | 0.8 | | B | D | A | |
| 77 | #1 | A2 | 6 | T5 | 0.8 | | B | D | A | |
| 78 | #1 | A3 | 11 | T5 | 0.8 | | B | D | A | |
| 79 | #1 | GA | 0.2 | C1 | 0 | | C | G | C | Comparative Example |
| 80 | #1 | GA | 0.2 | C2 | 0 | | standard | G | C | Comparative Example |
| 81 | #1 | G1 | 0.4 | C2 | 0 | | standard | D | C | Comparative Example |
| 82 | #1 | A1 | 55 | C2 | 0 | | standard | G | C | Comparative Example |
| 83 | #1 | A2 | 6 | C2 | 0 | | standard | G | C | Comparative Example |
| 84 | #1 | A3 | 11 | C2 | — | | standard | G | C | Comparative Example |
| 85 | #1 | GA | 0.2 | S19 | 0.8 | | B | D | C | Al: 0.0085 g/m$^2$ |
| 86 | #1 | GA | 0.2 | S20 | 0.8 | | B | D | B | Al: 0.0042 g/m$^2$ |
| 87 | #1 | GA | 0.2 | S21 | 0.8 | | B | D | A | Al: 0.0017 g/m$^2$ |
| 88 | #1 | GA | 0.2 | S22 | 0.8 | | B | D | C | P: 0.0137 g/m$^2$ |
| 89 | #1 | GA | 0.2 | S23 | 0.8 | | B | D | B | P: 0.0068 g/m$^2$ |
| 90 | #1 | GA | 0.2 | S24 | 0.8 | | B | D | A | P: 0.0017 g/m$^2$ |
| 91 | #1 | GA | 0.2 | S25 | 0.8 | | B | D | C | V: 0.0118 g/m$^2$ |
| 92 | #1 | GA | 0.2 | S26 | 0.8 | | B | D | B | V: 0.0059 g/m$^2$ |
| 93 | #1 | GA | 0.2 | S27 | 0.8 | | B | D | A | V: 0.0024 g/m$^2$ |
| 94 | #1 | GA | 0.2 | S28 | 0.8 | | B | F | C | Cu: 0.0256 g/m$^2$ |
| 95 | #1 | GA | 0.2 | S29 | 0.8 | | B | E | B | Cu: 0.0128 g/m$^2$ |
| 96 | #1 | GA | 0.2 | S30 | 0.8 | | B | D | A | Cu: 0.0038 g/m$^2$ |
| 97 | #1 | GA | 0.2 | S31 | 0.8 | | B | D | A | Cr: 0.0166 g/m$^2$ |
| 98 | #1 | GA | 0.2 | S32 | 0.8 | | B | D | A | Cr: 0.0083 g/m$^2$ |
| 99 | #1 | GA | 0.2 | T26 | 0.8 | | B | A | C | Al: 0.0085 g/m$^2$ |
| 100 | #1 | GA | 0.2 | T27 | 0.8 | | B | A | B | Al: 0.0042 g/m$^2$ |
| 101 | #1 | GA | 0.2 | T28 | 0.8 | | B | A | A | Al: 0.0017 g/m$^2$ |
| 102 | #1 | GA | 0.2 | T29 | 0.8 | | B | A | C | P: 0.0137 g/m$^2$ |
| 103 | #1 | GA | 0.2 | T30 | 0.8 | | B | A | B | P: 0.0068 g/m$^2$ |
| 104 | #1 | GA | 0.2 | T31 | 0.8 | | B | A | A | P: 0.0017 g/m$^2$ |
| 105 | #1 | GA | 0.2 | T32 | 0.8 | | B | A | C | V: 0.0118 g/m$^2$ |
| 106 | #1 | GA | 0.2 | T33 | 0.8 | | B | A | B | V: 0.0059 g/m$^2$ |
| 107 | #1 | GA | 0.2 | T34 | 0.8 | | B | A | A | V: 0.0024 g/m$^2$ |
| 108 | #1 | GA | 0.2 | T35 | 0.8 | | B | C | C | Cu: 0.0256 g/m$^2$ |
| 109 | #1 | GA | 0.2 | T36 | 0.8 | | B | B | B | Cu: 0.0128 g/m$^2$ |
| 110 | #1 | GA | 0.2 | T37 | 0.8 | | B | A | A | Cu: 0.0038 g/m$^2$ |
| 111 | #1 | GA | 0.2 | T38 | 0.8 | | B | A | A | Cr: 0.0166 g/m$^2$ |
| 112 | #1 | GA | 0.2 | T39 | 0.8 | | B | A | A | Cr: 0.0083 g/m$^2$ |

As is clear from Table 3 above, it is found that the hot-dip zinc-based plated steel sheet according to the present invention not only suppresses excessive production of zinc oxides on the outer layer after hot pressing and exhibits excellent corrosion resistance, but also has excellent mold-adhesion resistance.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

The invention claimed is:

1. A hot-dip zinc-based plated steel sheet comprising:
a base steel sheet that is a metal substrate;
a hot-dip zinc-based plating layer provided on the base steel sheet; and
a surface treatment layer formed on at least one surface of the hot-dip zinc-based plating layer, wherein
the surface treatment layer is a mixture of granular oxide and resin, and the surface treatment layer contains more than or equal to 0.1 g/m$^2$ and less than or equal to 1.2 g/m$^2$ of granular oxide per one surface on a metal basis in which, in a temperature range of 900 to 1300 K, standard free energy of formation ($\Delta G^0$) of oxide is smaller than standard free energy of formation ($\Delta G^0_{Zn}$) of zinc oxide and larger than standard free energy of formation ($\Delta G^0_{Al}$) of aluminum oxide at an identical temperature, vanadium-containing compounds in a range of more than or equal to 0.0024 g/m$^2$ and less than or equal to 0.01 g/m$^2$ on a V basis as a content per one surface, and resin,
the granular oxide has a particle size of more than or equal to 3 nm and less than or equal to 100 nm, and
the resin contains a polyurethane resin, a polyester resin, an epoxy resin, a (meth)acrylic resin, or a phenol resin, with the proviso that an oxide of silicon is excluded from the granular oxide.

2. The hot-dip zinc-based plated steel sheet according to claim 1, wherein
the surface treatment layer further contains at least one selected from phosphorus-containing compounds, copper-containing compounds, aluminum-containing compounds, and chromium-containing compounds;
in the following range as a content per one surface,
the phosphorus-containing compounds: more than 0.0 g/m$^2$ and less than or equal to 0.01 g/m$^2$ on a P basis,
the copper-containing compounds: more than 0.0 g/m$^2$ and less than or equal to 0.02 g/m$^2$ on a Cu basis, the aluminum-containing compounds: more than 0.0 g/m² and less than or equal to 0.005 g/m² on an Al basis, and the chromium-containing compounds: more than 0.0 g/m² and less than or equal to 0.01 g/m² on a Cr basis, wherein, if any of the phosphorus-containing compounds, copper-containing compounds, aluminum-containing compounds, and chromium-containing compounds are present, these compounds must be in the ranges above.

3. The hot-dip zinc-based plated steel sheet according to claim 1, wherein the base steel sheet has a chemical composition of, in mass %, C: 0.05 to 0.4%,
Si: less than or equal to 0.5%,
Mn: 0.5 to 2.5%,
P: less than or equal to 0.03%,
S: less than or equal to 0.01%,
sol. Al: less than or equal to 0.1%,
N: less than or equal to 0.01%,
B: 0 to 0.005%,
Ti: 0 to 0.1%,
Cr: 0 to 0.5%,
Nb: 0 to 0.1%,
Ni: 0 to 1.0%,
Mo: 0 to 0.5%, and
the balance: Fe and impurities.

4. The hot-dip zinc-based plated steel sheet according to claim 1, wherein the base steel sheet has a chemical composition of, in mass %, C: 0.05 to 0.4%,
Si: less than or equal to 0.5%,
Mn: 0.5 to 2.5%,
P: less than or equal to 0.03%,
S: less than or equal to 0.01%,
sol. Al: less than or equal to 0.1%,
N: less than or equal to 0.01%,
B: 0 to 0.005%,
Ti: 0 to 0.1%,
Cr: more than 0% and less than or equal to 0.5%,
Nb: 0 to 0.1%,
Ni: 0 to 1.0%,
Mo: 0 to 0.5%, and
the balance: Fe and impurities, and
the base steel sheet satisfies a relationship of
Mn+Cr: 0.5 to 3.0%.

5. The hot-dip zinc-based plated steel sheet according to claim 1, wherein the granular oxide is metal oxide.

6. The hot-dip zinc-based plated steel sheet according to claim 1, wherein the granular oxide is an oxide of titanium.

7. The hot-dip zinc-based plated steel sheet according to claim 1, wherein the granular oxide has a particle size of more than or equal to 5 nm and less than or equal to 30 nm.

8. The hot-dip zinc-based plated steel sheet according to claim 1, wherein a content of the granular oxide per one surface on a metal basis is more than or equal to 0.2 g/m² and less than or equal to 0.8 g/m².

9. The hot-dip zinc-based plated steel sheet according to claim 1, wherein the surface treatment layer contains more than or equal to 0.05 g/m² and less than or equal to 0.35 g/m² of an oxide of an alkaline-earth metal per one surface on a metal basis in which, in a temperature range of 900 to 1300 K, standard free energy of formation ($\Delta G^0$) of oxide is smaller than standard free energy of formation ($\Delta G^0_{Al}$) of aluminum oxide at an identical temperature.

10. The hot-dip zinc-based plated steel sheet according to claim 9, wherein the oxide of the alkaline-earth metal is an oxide of calcium or an oxide of magnesium.

11. The hot-dip zinc-based plated steel sheet according to claim 9, wherein the content of the oxide of the alkaline-earth metal per one surface on a metal basis is more than or equal to 0.05 g/m² and less than or equal to 0.2 g/m².

12. The hot-dip zinc-based plated steel sheet according to claim 1, wherein the hot-dip zinc-based plated steel sheet is a hot-dip zinc-based plated steel sheet for hot pressing.

13. A hot-dip zinc-based plated steel sheet comprising:

a base steel sheet that is a metal substrate;

a hot-dip zinc-based plating layer provided on the base steel sheet; and a surface treatment layer formed on at least one surface of the hot-dip zinc-based plating layer, wherein the surface treatment layer is a mixture of granular oxide and resin, and the surface treatment layer contains more than or equal to 0.1 g/m² and less than or equal to 1.2 g/m² of granular oxide per one surface on a metal basis in which, in a temperature range of 900 to 1300 K, standard free energy of formation ($\Delta G^0$) of oxide is smaller than standard free energy of formation ($\Delta G^0_{Zn}$) of zinc oxide and larger than standard free energy of formation ($\Delta G^0_{Al}$) of aluminum oxide at an identical temperature, and further contains more than or equal to 0.05 g/m² and less than or equal to 0.35 g/m² of an oxide of an alkaline-earth metal per one surface on a metal basis in which, in a temperature range of 900 to 1300 K, standard free energy of formation ($\Delta G^0$) of oxide is smaller than standard free energy of formation ($\Delta G^0_{Al}$) of aluminum oxide at an identical temperature, vanadium-containing compounds in a range of more than or equal to 0.0024 g/m² and less than or equal to 0.01 g/m² on a V basis as a content per one surface, and resin, the granular oxide has a particle size of more than or equal to 3 nm and less than or equal to 100 nm, and the resin contains a polyurethane resin, a polyester resin, an epoxy resin, a (meth)acrylic resin, or a phenol resin, with the proviso that magnesium is excluded from the alkaline-earth metal.

\* \* \* \* \*